Patented Nov. 4, 1930

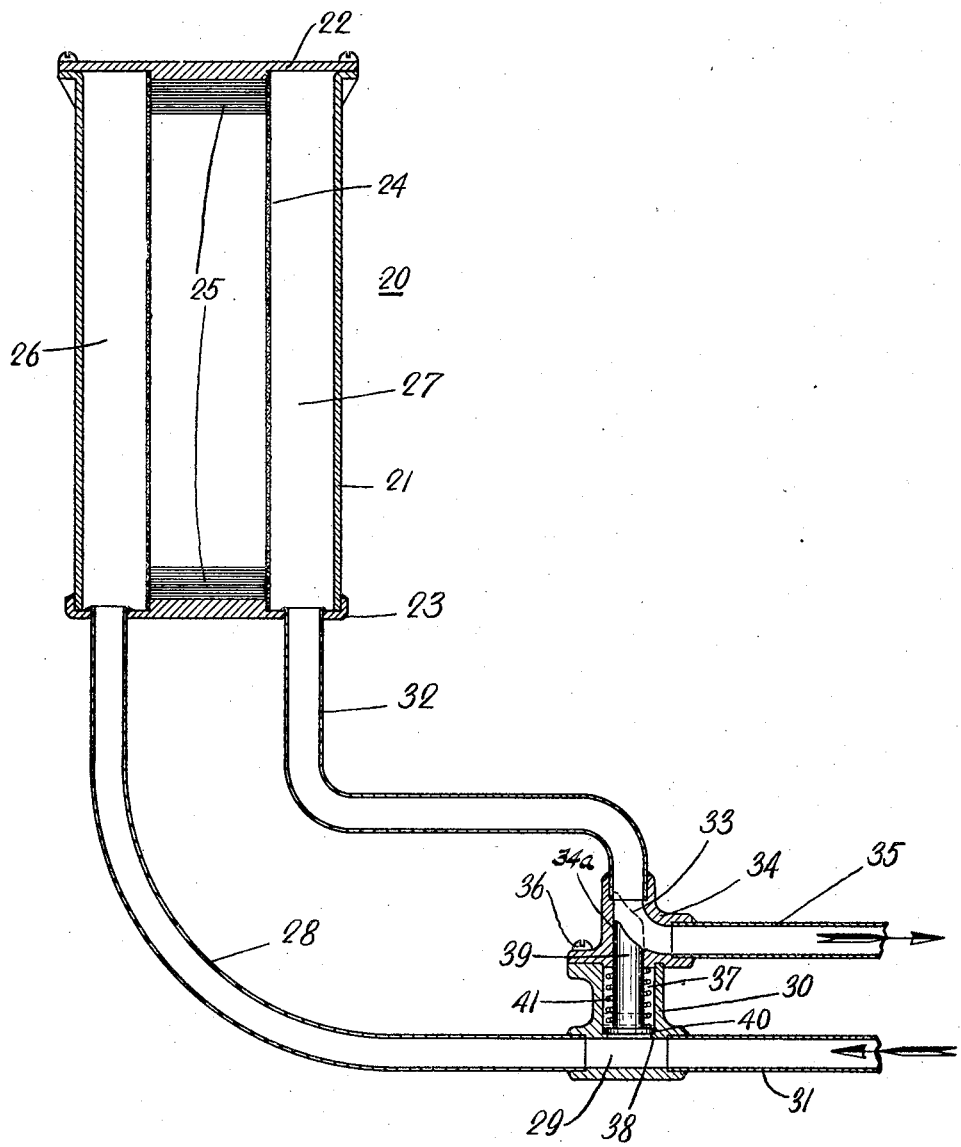

1,780,723

UNITED STATES PATENT OFFICE

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE

CONTROL FOR OIL FILTERS

Application filed June 3, 1926. Serial No. 113,488.

This invention relates to improvements in refining devices and more particularly to such devices used for the purpose of refining or filtering the lubricant for internal combustion engines.

One of the difficulties encountered in the employment of existing types of filters arises after the filter has been in use for a time and the separated dirt and foreign matters tend to partially clog the filter or strainer member, offering increased resistance to the fluid flow. In such event there is a material difference in pressure on the respective sides of the filter member. The increased resistance to the flow of fluid through the filter raises the pressure on the inlet side and correspondingly lowers the pressure on the outlet side. This difference in pressure may exceed the structural strength of the filtering medium, and as a result, the force or pressure breaks down or punctures the filter wall, allowing all the dirt previously separated to flow through the free passage, and destroying all subsequent filtering action.

It is among the objects of the present invention to prevent the filter member from breaking down or becoming punctured due to excessive inequalities of pressure in the respective sides of the filter and to automatically limit the difference of pressure and maintain it relatively uniform.

Referring to the drawing in which the refining device is shown in section, the numeral 20 designates a tank comprising a body portion 21 provided with a removable head 22 and a bottom 23. The bottom 23 and cover 22 are both provided with a central inner extension about which a coarse screen element 24 is adapted to fit. Inside of the screen element there is provided a filtering member 25, which may be of any suitable type, but shown in the drawing as comprising a plurality of sheets of fibrous material placed in stacked relation. The screen 24, and the filtering member contained therein, provide a partition wall in the tank 20 dividing the tank into an intake chamber 26 on one side and an outlet chamber 27 on the other side of said partition.

Leading into the intake chamber 26 is a conduit 28, one end of which is secured in an aperture formed in the bottom 23 while the opposite end is in communication with a passage 29 formed in the housing 30. Another conduit 31 communicates with the outlet passage 29, said conduit being connected with any suitable fluid circulating pump or the like, not shown in the drawings. The passage formed by conduits 31 and 28 and passage 29 may be termed the "inlet passage."

Bottom 23 is apertured to receive a conduit 32 which communicates with the outlet chamber 27 and with a passage 33 formed in housing portion 34. Another conduit 35 leads from the passage 33. Passage formed by conduits 32 and 35 and passage 33 may be termed the "outlet passage."

The housing 30 and the housing portion 34 are connected together by means of screws as shown at 36. Housing 30 is recessed to form chamber 37, the end of said chamber communicating with passage 29 and being provided with a flange 38. Housing portion 34 has a passage 34$^a$ of smaller transverse diameter than the chamber 37, said passage forming communication between the passage 33 and the chamber 37. A plunger comprising a shank portion 39 and a head portion 40 is provided in the passage 34$^a$ and chamber 37 respectively. The head portion 40 rests against the flange 38 and is normally held in engagement therewith by means of a spring 41 interposed between said head portion 40 and housing 34. The shank 39 of the plunger extends from the chamber 37 through the passage 34$^a$, its end normally being flush with the wall of the passage, as shown in the drawing.

When the fluid is being forced through the conduit 31, in the direction of the arrow, it will flow through passage 29, and conduit 28 into inlet chamber 26, the pressure forcing said fluid through the filtering member 25 and into the outlet chamber 27. From this outlet chamber fluid will pass through conduit 32, passage 33 and conduit 35 in the direction of the arrow. At ordinary pressures the foreign particles in the fluid, such as dirt and the like, will gather on the inlet side of the filtering member 25 while the fluid passes through said member and enters into the outlet chamber in a cleansed condition. However, when excessive pressures are exerted in the inlet chamber, quite a substantial portion of the foreign substances in the fluid will be forced into the filtering member, tending to partially clog or fill the same and thereby reduce the efficiency of said member and offer increased resistance to the fluid flow.

The excessive pressures in the passage 29 will tend to push the plunger upwardly or away from passage 29 against the effect of the spring 41, thus causing the shank portion 39 of the plunger to extend into the passage 33 as shown in the dotted line on the drawing. Insertion of the shank portion 39 into the passage 33 will restrict the flow of fluid therethrough, and thereby cause a back pressure in the outlet chamber of tank 20. Back pressure in this chamber will counteract pressures in the inlet chamber 26 and maintain the pressures in the respective passages relatively uniform, thereby eliminating the breaking or tearing down of the filter wall. Excessive pressure in the passage 29 will cause the restriction in passage 33 to be correspondingly increased and when the pressure in said inlet passage is again reduced, the restriction in the outlet passage is relatively reduced. Thus it will be seen that the pressure in the outlet chamber will be controlled in accordance with the varying pressures in the inlet passage, so that the pressure in said inlet chamber will not materially exceed that in the outlet chamber and there will be no tendency for the inlet pressure to force its way thru the filter wall, by breaking down or puncturing the filter wall.

While the form of embodiment of the invention as herein disclosed, constitutes a preferred form, it is to be understood that other forms might be adopted, all coming within the scope of the claims which follow.

What is claimed is as follows:

1. The combination of a filter having inlet and outlet passages and means for maintaining a substantially uniform pressure differential in the respective passages.

2. The combination of a filter having inlet and outlet passages, means in said outlet and inlet passages movable in response to an increase in pressure in said inlet to restrict the cross-sectional area of said outlet passage.

3. A refining device comprising in combination, a filtering member including an inlet chamber adapted to receive a fluid under pressure; an outlet chamber; and means, dependent upon the pressure of the fluid being introduced into the inlet chamber, for providing a back pressure in the outlet chamber, whereby to control the pressure in the inlet chamber.

4. A refining device comprising in combination, a filtering member including an inlet chamber adapted to receive a fluid under pressure; an outlet chamber; conduits for both the inlet and outlet chambers; means in the outlet conduit adapted to impede the flow of fluid therethrough, and means in the inlet chamber, connected with the impeding means in the outlet chamber, for controlling the said impeding means in accordance with the pressure of the fluid in the inlet conduit.

5. A refining device comprising in combination, a filtering member including an inlet chamber adapted to receive a fluid under pressure; an outlet chamber; conduits for both the inlet and outlet chambers; a valve in the outlet conduit; and a control for said valve, in the inlet conduit, adapted to operate the valve in accordance with the pressure of the fluid in the inlet conduit.

6. A refining device comprising in combination a filtering member including an inlet chamber adapted to receive a fluid under pressure; an outlet chamber; conduits for both the inlet and outlet chambers; a valve housing including passages to which are connected the inlet and outlet conduits respectively; and a plunger valve interposed between said passages, and adapted to be operated by the varying pressure of the fluid in the inlet conduit passage to control the flow of fluid through the outlet conduit passage.

7. A refining device comprising in combination a filtering member including an inlet chamber adapted to receive a fluid under pressure; an outlet chamber; conduits for both the inlet and outlet chambers, a housing including a passage connected to the inlet conduit; a passage connected to the outlet conduit; a third passage connecting both of said passages; and a plunger in said third passage, including a head portion forming a movable partition between the inlet and third passages and a shank portion the end of which forms a portion of the wall of the outlet passage, said plunger being adapted to be operated by the pressure of the fluid in the inlet passage to control the flow of fluid in the outlet passage in accordance with the said pressure in the inlet passage.

8. In combination with a filter, inlet and outlet pipes for said filter, means connecting said inlet and outlet pipes, and a flow control valve in said means for maintaining a substantially equal pressure differential between the inlet and outlet pipes.

9. The combination of claim 8, said valve being spring pressed and adapted to restrict said outlet pipe and urged by said spring away from said outlet pipe.

10. The combination of claim 8, said valve operated in one direction by the pressure in the inlet pipe to restrict the outlet pipe and by a spring in the opposite direction to remove the restriction.

11. In a flow control for oil filters, an inlet and an outlet for said filter, said control positioned between said inlet and said outlet and comprising a housing, a plunger operating in said housing, said plunger operated in one direction by the oil pressure in the inlet to restrict the outlet, and a spring for operating said plunger in the opposite direction to clear the outlet of the restriction.

12. The combination of claim 11, said plunger having an enlarged head resting on a flange in said housing.

13. The combination of claim 11, said spring surrounding said plunger and confined between a head on the plunger and the housing.

14. The combination of a filter having inlet and outlet passages, and movable means between said inlet and outlet passages and responsive to increase in pressure in the inlet for maintaining a constant pressure differential between inlet and outlet passages, said means also controlling the flow of fluid from the outlet passage in accordance with the pressure of the fluid in the inlet passage.

15. The combination of a filter having a filtering material and inlet and outlet passages, and means for limiting the passage of fluid through the filtering material when the fluid pressure in the intake passage exceeds a certain value, said means maintaining a constant pressure differential between inlet and outlet passages.

16. A refining device comprising in combination, a filtering member including an inlet chamber adapted to receive a fluid under pressure, an outlet chamber, and means dependent upon the pressure of the fluid being introduced into the inlet chamber, for providing a back pressure in the outlet chamber, whereby to control the pressure in the inlet chamber, said means also maintaining a constant pressure differential between inlet and outlet chambers.

17. A refining device comprising in combination, a filtering member including an inlet chamber adapted to receive a fluid under pressure, an outlet chamber, conduits for both the inlet and outlet chambers, means in the outlet conduit adapted to impede the flow of fluid therethrough, and means in the inlet chamber, connected with the impeding means in the outlet chamber, for controlling said impeding means in accordance with the pressure of the fluid in the inlet conduit, said means also maintaining a constant pressure differential between inlet and outlet conduits.

18. A refining device comprising in combination, a filtering member including an inlet chamber adapted to receive a fluid under pressure, an outlet chamber, conduits for both the inlet and outlet chambers, a valve in the outlet conduit, and a control for said valve, in the inlet conduit, adapted to operate the valve in accordance with the pressure of the fluid in the inlet conduit, said control also maintaining a constant pressure differential between inlet and outlet conduits.

In testimony whereof I affix my signature.

CHARLES R. SHORT.